(12) United States Patent
Dhanalakoti et al.

(10) Patent No.: US 8,914,663 B2
(45) Date of Patent: Dec. 16, 2014

(54) RESCHEDULING FAILED BACKUP JOBS

(75) Inventors: Hari Dhanalakoti, Hyderabad (IN);
Sreekanth Gopisetty, Hyderabad (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 183 days.

(21) Appl. No.: 13/432,309

(22) Filed: Mar. 28, 2012

(65) Prior Publication Data
US 2013/0262925 A1 Oct. 3, 2013

(51) Int. Cl.
*G06F 11/00* (2006.01)

(52) U.S. Cl.
USPC .............................. 714/2; 714/4.11; 714/4.2

(58) Field of Classification Search
USPC ........................ 714/2, 25, 4.1, 47.1
See application file for complete search history.

(56) References Cited

U.S. PATENT DOCUMENTS

| | | | |
|---|---|---|---|
| 6,434,631 B1 | 8/2002 | Bruno et al. | |
| 6,694,450 B1 | 2/2004 | Kidder et al. | |
| 7,665,090 B1 | 2/2010 | Tormasov et al. | |
| 7,996,718 B1 * | 8/2011 | Ou et al. | 714/23 |
| 2003/0074387 A1 | 4/2003 | Tanaka | |
| 2004/0122832 A1 * | 6/2004 | Heil | 707/100 |
| 2005/0149684 A1 * | 7/2005 | Sankaran et al. | 711/162 |
| 2006/0259724 A1 | 11/2006 | Saika | |
| 2007/0294697 A1 | 12/2007 | Theimer et al. | |
| 2008/0263551 A1 | 10/2008 | Ali et al. | |
| 2010/0138391 A1 | 6/2010 | Namikawa et al. | |
| 2010/0211815 A1 | 8/2010 | Mankovskii et al. | |
| 2011/0191777 A1 * | 8/2011 | Bansal et al. | 718/102 |
| 2012/0084501 A1 * | 4/2012 | Watanabe et al. | 711/112 |
| 2013/0086341 A1 * | 4/2013 | Vasavi et al. | 711/162 |

OTHER PUBLICATIONS

"Rerun Faded Avamar VMDK Backup Jobs"; Feb. 17, 2011; 3 pages.
"Restart Failed Backup Job Automaticaily in Backup Exec"; 11 pages.

* cited by examiner

*Primary Examiner* — Sarai Butler
(74) *Attorney, Agent, or Firm* — Kraig Jakobsen

(57) ABSTRACT

Techniques for rescheduling a failed backup job are described in various implementations. A method that implements the techniques may include identifying a failed instance of a backup job, and determining an estimated amount of time to complete a rescheduled execution of the failed instance. The method may also include determining an available window of time in a backup schedule that equals or exceeds the estimated amount of time to complete the rescheduled execution, and rescheduling the failed instance for execution during the available window of time.

15 Claims, 4 Drawing Sheets

RESCHEDULING FAILED BACKUP JOBS

BACKGROUND

Many companies place a high priority on the protection of data. In the business world, the data that a company collects and uses is often the company's most important asset, and even a relatively small loss of data or data outage may have a significant impact. In addition, companies are often required to safeguard their data in a manner that complies with various data protection regulations. As a result, many companies have made sizeable investments in data protection and data protection strategies.

As one part of a data protection strategy, many companies perform backups of portions or all of their data. Data backups may be executed on an as-needed basis, but more typically are scheduled to execute on a recurring basis (e.g., nightly, weekly, or the like). Such data backups may serve different purposes. For example, one purpose may be to allow for the recovery of data that has been lost or corrupted. Another purpose may be to allow for the recovery of data from an earlier time—e.g., to restore previous versions of files and/or to restore a last known good configuration.

Backups typically involve making secondary copies of selected data on separate hardware, such as on a separate disk array, tape library, or optical storage device. Backups may be full backups of the selected data, cumulative incremental backups (where all changes since the last full backup are copied), differential incremental backups (where only the portions changed since the last full or cumulative incremental backup are copied), or other appropriate types of backups. Some backup policies may include a combination of these alternatives (e.g., full backups on the weekend, followed by daily cumulative incremental backups during the week). To minimize the impact on normal operations, backups are usually scheduled to occur during time periods when the system usage is expected to be at its lowest, such as late in the evening or during the early morning hours.

DETAILED DESCRIPTION

Figure 1:
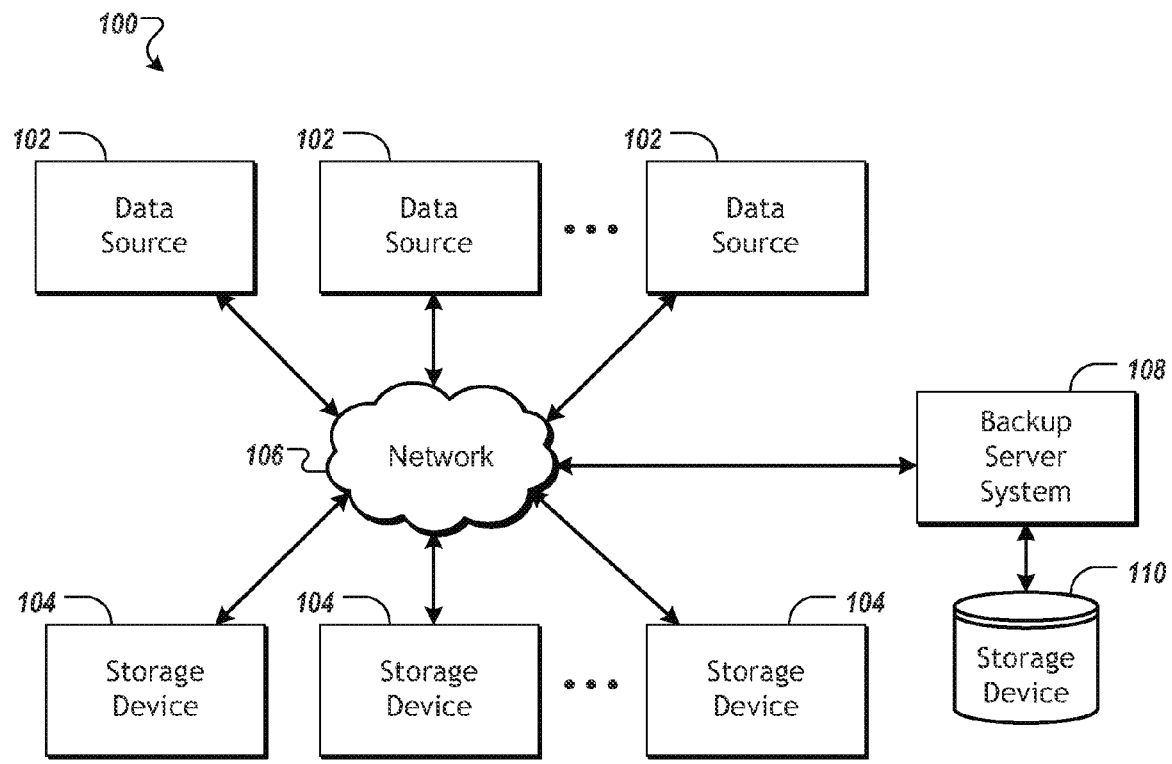
FIG. 1 shows a block diagram of an example backup system.

Backup servers may be used to maintain and manage a number of different backup operations (or backup jobs), each of which may be targeted to back up various portions of an entity's data. While backup jobs often complete successfully, there are also instances when the backup jobs fail. Backup jobs may fail for any of a number of reasons, including for example, scheduling conflicts in the backup system, non-availability of backup storage media, non-availability of source media, network failures, and other reasons.

When backup failures occur, the data that was scheduled to be backed up by a particular job does not get backed up, which may result in an undesirable gap in data protection. In some cases, human backup administrators may be tasked with manually rescheduling failed backup jobs for a later date. However, due to the multitude of ongoing backup schedules (which may include hundreds or more backup jobs per day) and the frequency with which backup failures occur (which may be as high as 25% or even higher), the backup administrator's role may be prone to error. In addition, the failed backup jobs may typically not be rescheduled until well after the backup job was originally scheduled, if they are even rescheduled at all.

According to the techniques described here, a backup server may automatically identify and reschedule failed backup jobs such that the time between the originally scheduled backup job and the rescheduled backup job is reduced. For example, the backup server may analyze various parameters associated with failed backup jobs (e.g., job size, job history, and the like), determine when the backup jobs may be re-run such that the jobs are likely to be completed successfully, and automatically reschedule the backup jobs to be re-run at the determined time. In some cases, a failed backup job may be automatically rescheduled to re-run on the same day that the failure occurred.

In some implementations, a method of rescheduling a failed backup job may include identifying a failed instance of a backup job, and determining an estimated amount of time to re-run the failed instance. The amount of time to re-run the failed instance of the backup job may be estimated based on historical backup information associated with previously completed instances of the backup job (e.g., how long the previous instances took to complete, how much data the previous instances backed up, what types of backups the previous instances included, and the like). The method may also include determining an available window of time in a backup schedule that accommodates the estimated amount of time to re-run the failed instance, and rescheduling the failed instance for execution during the available window of time.

The techniques described here may be used, for example, to increase the efficiency of backup systems by providing an increased probability of finding an appropriate backup window during which to reschedule a failed backup job, which may result in lower failure rates. In addition, failed backup jobs may be identified, rescheduled, and re-run automatically by the backup server, and may even be re-run before a backup administrator would typically be made aware that the backup job had failed. These and other possible benefits and advantages will be apparent from the figures and from the description that follows.

FIG. 1 shows a block diagram of an example backup system 100. Backup system 100 may include multiple data sources 102 and multiple target storage devices 104, each of which may be interconnected through a network 106. Network 106 may represent a single network, a group of networks, or other appropriate switching fabrics. Also connected to network 106 is a backup server system 108. Backup server system 108 may contain, or have access to, one or more tangible, non-transitory computer-readable storage mediums such as storage device 110. The example topology of system 100 may provide data backup capabilities representative of various backup environments. However, it should be understood that the example topology is shown for illustrative purposes only, and that various modifications may be made to the configuration. For example, backup system 100 may include different or additional components, or the components may be connected in a different manner than is shown.

Data sources 102 need not all be of the same type. Indeed, in many environments, data sources 102 will typically vary in type. For example, in an enterprise environment, data sources 102 might take the form of database server clusters, application servers, content servers, email servers, desktop computers, and the like. Similarly, target storage devices 104 may vary in type. One might be a magnetic disk drive or a set of magnetic disk drives managed by a host to present disk blocks or entire file systems to clients. Others might be tape drives or optical disk drive devices. Other appropriate types of storage devices may also be used. Network 106 may take any appropriate form, including without limitation the Internet, an intranet, a local area network, a backplane or other switching fabric internal to a host computer, a fibre channel network, or any appropriate combination of the foregoing. The host computing devices that support backup server system 108 may also take any number of different forms, including any appropriate electronic devices having functionality for processing data and/or instructions. Storage mediums such as storage device 110 may also take any appropriate form, including for example magnetic disks, optical disks, flash memory, system memory, or the like.

According to the techniques described here, the backup server system 108 may be configured to reschedule one or more failed backup jobs such that the jobs are re-run without human interaction, e.g., from a backup administrator. As described here, the backup server system 108 may identify a failed instance of a backup job, and may determine an estimated amount of time that it will take to re-run the failed instance. The backup server system 108 may also determine an available window of time in a backup schedule that accommodates the estimated amount of time to re-run the failed instance, and may automatically reschedule the failed instance for execution during the available window of time.

Figure 2:
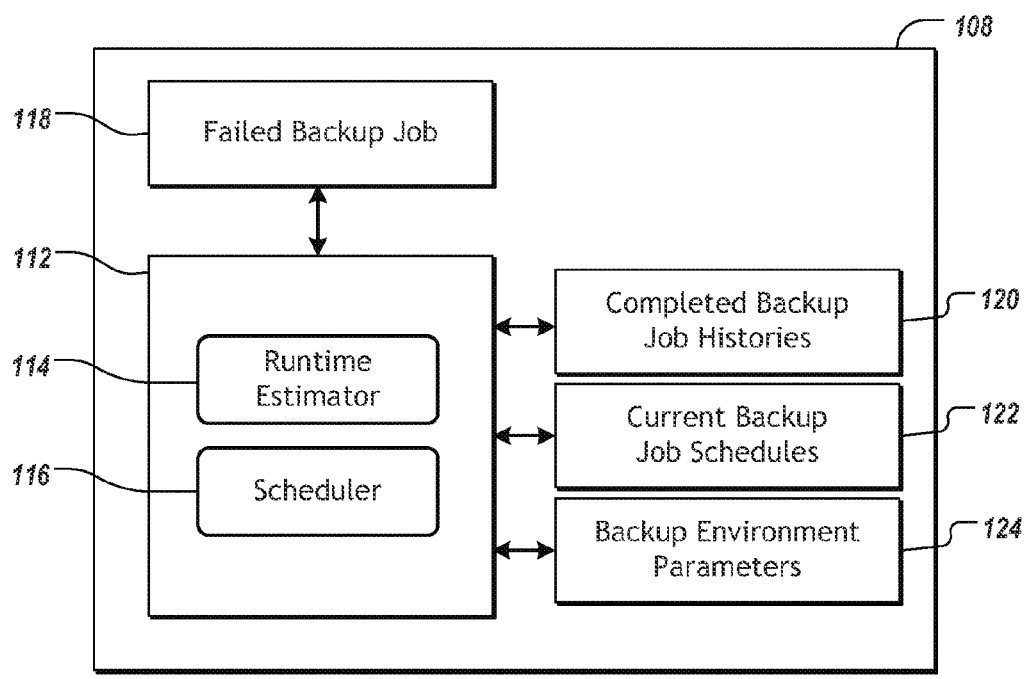
FIG. 2 shows a block diagram of example components contained in and/or implemented by a backup server system.

FIG. 2 shows a block diagram of example components contained in and/or implemented by backup server system 108. It should be understood that these components are shown for illustrative purposes only, and that in some cases, the functionality being described with respect to a particular component may be performed by one or more different or additional components. Similarly, it should be understood that portions or all of the functionality may be combined into fewer components than are shown. In some implementations, one or more of the components may be contained in and/or implemented by one or more of the other components of FIG. 1, including for example data sources 102 or target storage devices 104. The components of backup server system 108 need not all reside on the same host.

Backup server system 108 may implement a re-run module 112 that reschedules one or more failed backup jobs to be re-run at an appropriate time in accordance with the techniques described here. Re-run module 112 may execute on a processor (not shown), which may be configured to process instructions for execution by the re-run module 112. The instructions may be stored on a tangible, non-transitory computer-readable storage medium, such as in a main memory, on a separate storage device, or on any other type of volatile or non-volatile memory that stores instructions to cause a programmable processor to perform the functionality described herein. Alternatively or additionally, re-run module 112 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the functionality described herein. In some implementations, multiple processors may be used, as appropriate, along with multiple memories and/or different or similar types of memory.

Re-run module 112 may include a runtime estimator 114 and a scheduler 116. In some implementations, the runtime estimator 114 may be used to determine an estimated backup runtime that corresponds to how long a backup job is expected to take. The scheduler 116 may be used to identify a time window in a backup schedule during which to execute the backup job based on the estimated backup runtime.

The runtime estimator 114 and scheduler 116 may use a number of different inputs for determining the estimated backup runtime and for identifying the time window in the backup schedule, respectively. For example, in some implementations, re-run module 112 may have access to a specification 118 for a failed backup job, a repository 120 of completed backup job histories, a repository 122 of current backup job schedules, and a collection 124 of one or more backup environment parameters.

In operation, the re-run module 112 may identify one or more failed instances of backup jobs that have occurred. For example, the repository 122 of current backup job schedules may include a job status for all backup jobs that have occurred during a given period (e.g., on a particular day), as well as those that are still pending for the given period (e.g., scheduled to occur later on the particular day). The job status may indicate, among other things, whether a particular job has completed successfully or has failed. As such, re-run module 112 may be configured to query the repository 122 to identify one or more failed instances of backup jobs. Such failure events may also be retrieved from a backup system event log or via other appropriate mechanisms. Re-run module 112 may also gather, e.g., from repository 122 or from other sources, other relevant information about the failed instances including, for example, the job name, job number, job size, job type, the reason that the backup job failed, and the like.

For any or all of the failed instances of backup jobs, the runtime estimator 114 may determine an estimated amount of time to complete a rescheduled execution of the failed instance. In other words, the runtime estimator 114 may estimate how long it will take to re-run the failed job, assuming that the job will be successfully re-run to completion. In some implementations, the estimated amount of time to complete the rescheduled execution of the failed instance may be based, at least in part, on historical backup information associated with previously completed instances of the backup job. For example, the estimated amount of time may be a function of the job size of the failed instance and a weighted average backup rate of the previously completed instances of the job. In some implementations, the estimated amount of time may be calculated by the function $$T_f = [(\Sigma(T_n/S_n))/N]*S_f$$

where $T_f$ is the estimated amount of time to re-run the failed instance, $T_n$ is the time taken to complete previous instance n, $S_n$ is the size of previous instance n, N is the number of previously completed instances being considered, and $S_f$ is the size of the failed instance. The historical backup information may be retrieved from a repository of job histories, e.g., repository 120, using appropriate queries from re-run module 112.

In some implementations, the historical backup information may also include a backup type, and the estimated amount of time to re-run the failed instance may also be based, at least in part, on the backup type of the failed instance as well as the backup types of the previously completed instances. In some cases, only previously completed instances of a same type may be considered in estimating the amount of time to re-run a particular job type. For example, if the failed instance of the backup job is an incremental backup, the estimation of how long the failed instance will take to re-run may only consider previously completed incremental backup instances (e.g., by excluding full backup instances from the analysis). Similarly, if the failed instance of the backup job is a full backup, the estimation may exclude incremental backup instances from the analysis. In alternative implementations, other appropriate techniques or combinations of techniques may be used to estimate the amount of time the system will take to re-run the failed backup job.

If no backup history exists for the failed backup job, the estimated time to re-run the job may be set to a user-defined value, or may be calculated using other information. For example, in some implementations, the estimated time to complete a job that failed on its first attempt may be set to zero. In other implementations, the estimated time to complete the job may be set to another value, such as a value that represents the average amount of time that backup jobs of a similar size have taken to complete, or to another appropriate value as determined by a backup administrator. In still other implementations, the estimated time to re-run the job may be calculated as a function of the average backup rate for the system and the size of the failed backup job (e.g., $T_f = S_f / Rate_{avg}$).

Scheduler 116 may then determine an available window of time in the backup schedule that accommodates the estimated amount of time to complete the rescheduled execution of the failed instance. For example, scheduler 116 may analyze repository 122 to determine a time period during which the backup server system 108 is available to re-run the failed backup job. In some implementations, scheduler 116 may determine an available window of time in a backup schedule, e.g., a first available window, that equals or exceeds the estimated amount of time to complete the rescheduled execution, as determined by runtime estimator 114 using any of the techniques described here.

In determining an available window of time in the backup schedule to re-run the failed instance, scheduler 116 may also consider information in collection 124 that relates to other backup environment parameters. The other backup environment parameters may include, for example, the availability of backup storage media, the availability of source media, network connectivity, and any other appropriate environmental parameters that may affect whether the failed backup job is likely to be successful if re-run at a particular time. In some implementations, if any of the backup environment parameters are considered as impediments to the job being re-run successfully during a particular window of time, then the particular window may be considered "unavailable" such that the backup job will not be rescheduled during the window even if no scheduling conflicts exist at that time.

After determining an available window, scheduler 116 may reschedule the failed instance for execution during the available window. Scheduler 116 may schedule the failed instance of the backup job to be re-run at the beginning, middle, or end of an available window, depending on the particular implementation. If the backup job is to be re-run in the middle or end of the available window, the estimated runtime of the backup job may be subtracted from the ending time of the window to determine the latest start time within the window that the job can be started. In some implementations, a buffer may be added to the beginning or end of an available window to improve the probability that the scheduled re-run time will not interfere with other backup operations that are scheduled to occur just before or just after the available window (e.g., for backup jobs that run longer than expected).

Figure 3A:
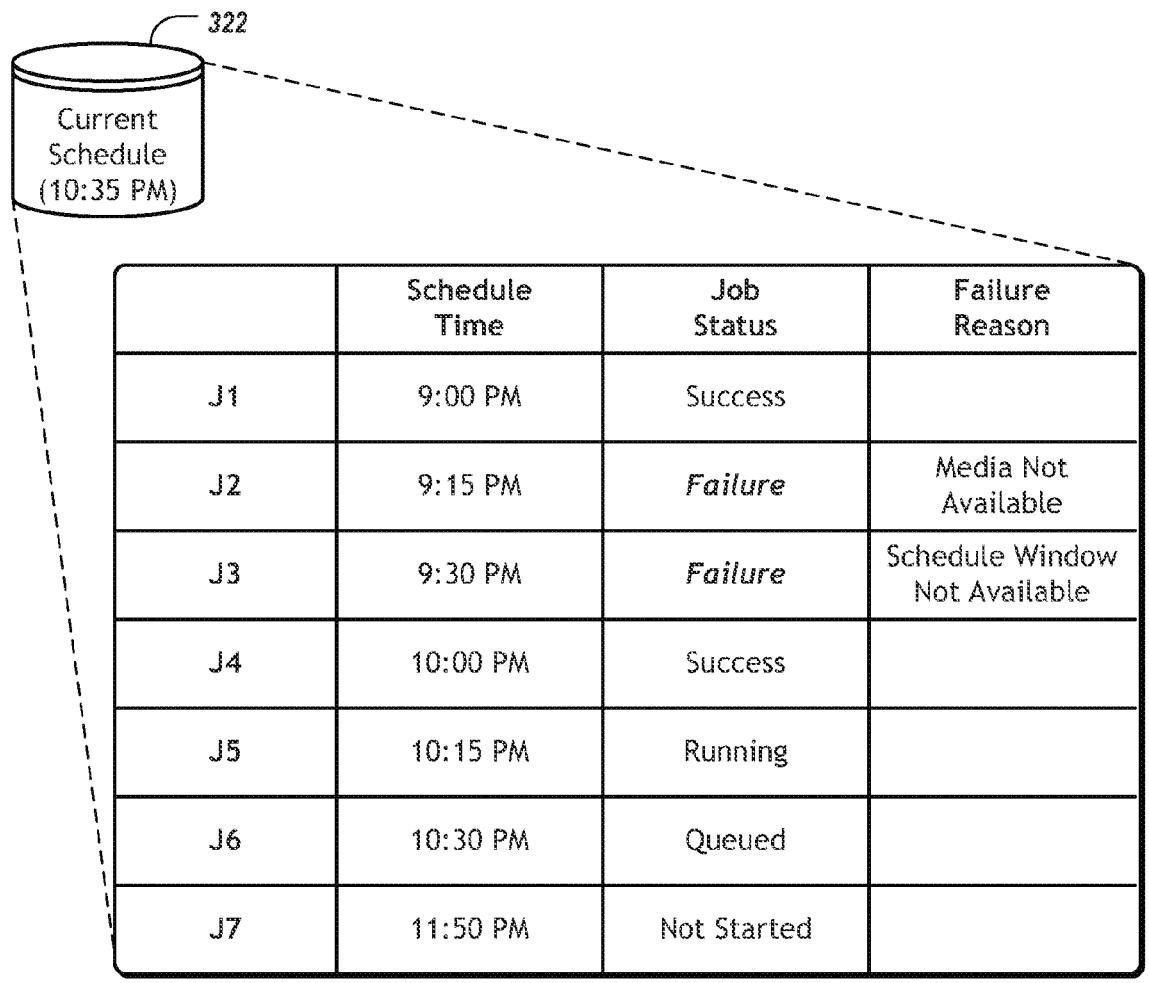
FIG. 3A shows an example of data stored in a repository of current backup job schedules.

FIG. 3A shows an example of data stored in a repository 322 of current backup job schedules. The data shown in repository 322 is for explanatory purposes only, and it should be understood that different or additional data and/or fields may be included in different implementations. During operation, repository 322 may be continuously or periodically updated as scheduled jobs in a given backup schedule are executed. As such, repository 322 may represent a snapshot of the state of a particular backup schedule—here, the state of the backup schedule at 10:35 pm. Repository 322 may also include other backup schedules and/or snapshots of other backup schedules.

As illustrated, two of the scheduled backup jobs (J2 and J3) have failed for different reasons, one job (J5) is currently running, and one job (J6) is queued to run, e.g., after job J5 completes. In addition, there is potentially an available period of time between the time when the second to last job in the schedule (J6) will complete and when the last job in the schedule (J7) is scheduled to begin, depending on the length of time that it will take to complete job J6.

In accordance with the techniques described here, the failed backup jobs J2 and/or J3 may automatically be rescheduled to run during an available period of time if the backup server determines a time when the backup jobs are likely to be completed successfully. An example implementation in which failed backup job J2 is evaluated for rescheduling is described below.

Figure 3B:
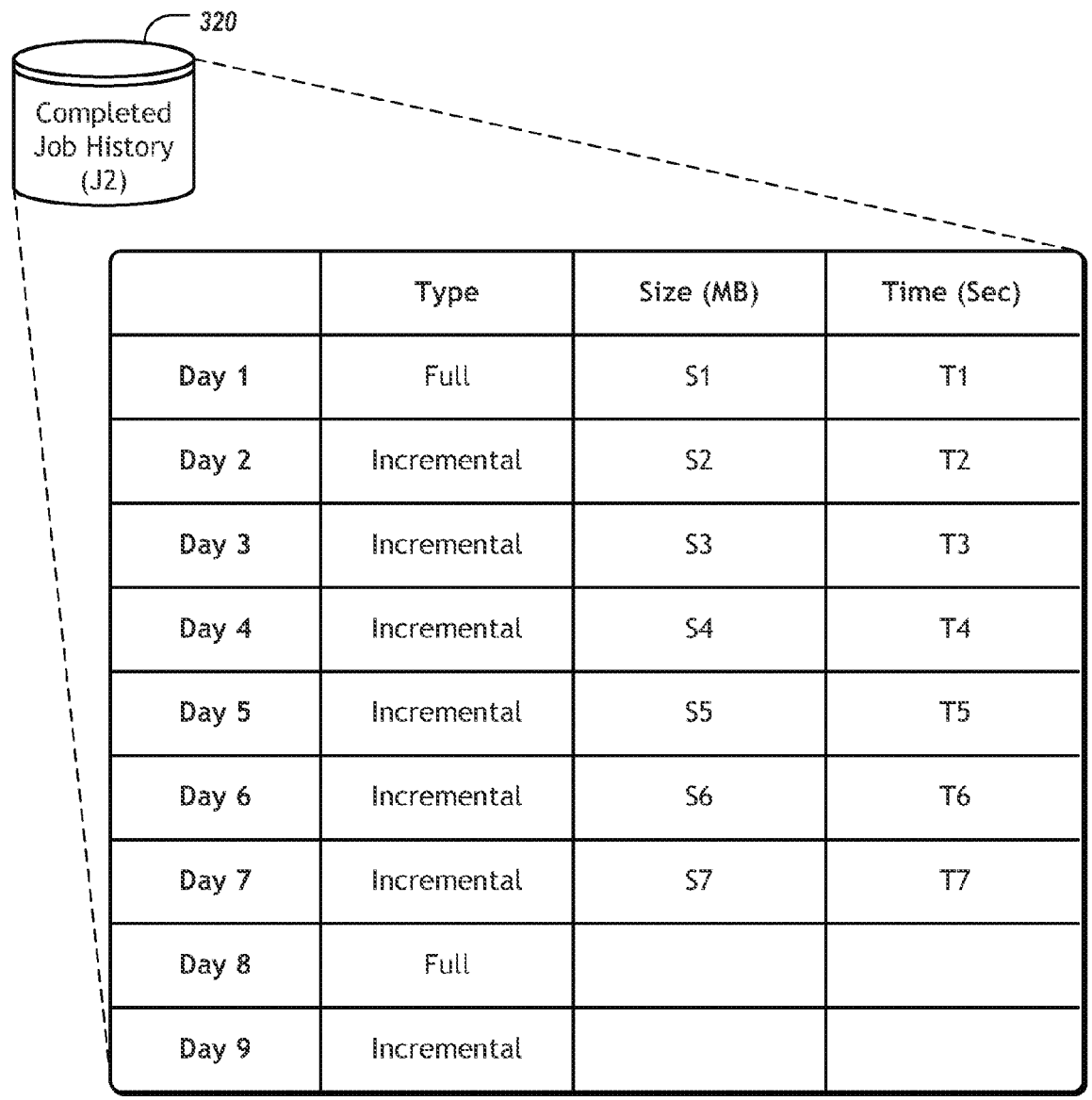
FIG. 3B shows an example of data stored in a repository of completed backup job histories.

FIG. 3B shows an example of data stored in a repository 320 of completed backup job histories. The data shown in repository 320 is for explanatory purposes only, and it should be understood that different or additional data and/or fields may be included in different implementations. During operation, repository 320 may be continuously or periodically updated as jobs are completed.

As illustrated, repository 320 shows the completed job history for a particular backup job, e.g., backup job J2. Repository 320 may also include one or more future scheduled instances of the particular backup job. Repository 320 may also include completed job histories, and one or more future scheduled instances, of other backup jobs (e.g., for backup job J3). The job history for J2 includes multiple instances of previously completed jobs, spanning seven days over which a backup instance of job J2 was completed on each day. For each of the instances, the repository 320 includes the type of backup performed (e.g., full versus incremental), the size of the backup (e.g., in megabytes), and the time it took to complete the backup (e.g., in seconds). It should be understood that repository 320 may also include other information related to the completed job histories as appropriate.

In an example of the techniques described here, assume that backup job J2 fails on day 8 when backup job J2 was scheduled to execute a full backup of selected data. Under these assumptions, the estimated time to complete a re-run of backup job J2 may be calculated as described above using the function $$T_f = [(\Sigma(T_n/S_n))/N]*S_f$$

which in this case resolves to $T_8 = (T_1/S_1 + T_2/S_2 + T_3/S_3 + \ldots + T_7/S_7)$ divided by the number of samples (7), and multiplied by the size of the failed instance of the backup job J2 ($S_8$).

In another example of the techniques described here, assume that backup job J2 completed successfully on day 8 (or was re-run successfully on day 8), and that backup job J2 fails on day 9 when backup job J2 was scheduled to execute an incremental backup. In implementations where all of the job history is considered, regardless of the type of backup that failed, the calculation would be similar to the one shown above, but with an additional day of backup job history. As such, the function would resolve to $T_9 = (T_1/S_1 + T_2/S_2 + T_3/S_3 + \ldots + T_8/S_8)$ divided by the number of samples (8), and multiplied by the size of the failed instance of the backup job J2

($S_9$). In other implementations, where only previously completed instances of a same type are considered in estimating the amount of time to re-run a particular job type, the day 1 and day 8 full backups may be excluded from the estimation. As such, the function would resolve to $T_9=(T_2/S_2+T_3/S_3+\ldots+T_7/S_7)$ divided by the number of samples (6), and multiplied by the size of the failed instance of the backup job J2 ($S_9$).

After determining $T_f$ for the failed instance of backup job J2 as described above, the scheduler may determine a next available window of time in the backup schedule that accommodates a backup job that will take $T_f$ (e.g., in seconds) to complete, and may reschedule the failed instance of backup job J2 to be re-run during the window. A similar analysis may be conducted for the failed instance of backup job J3.

Figure 4:
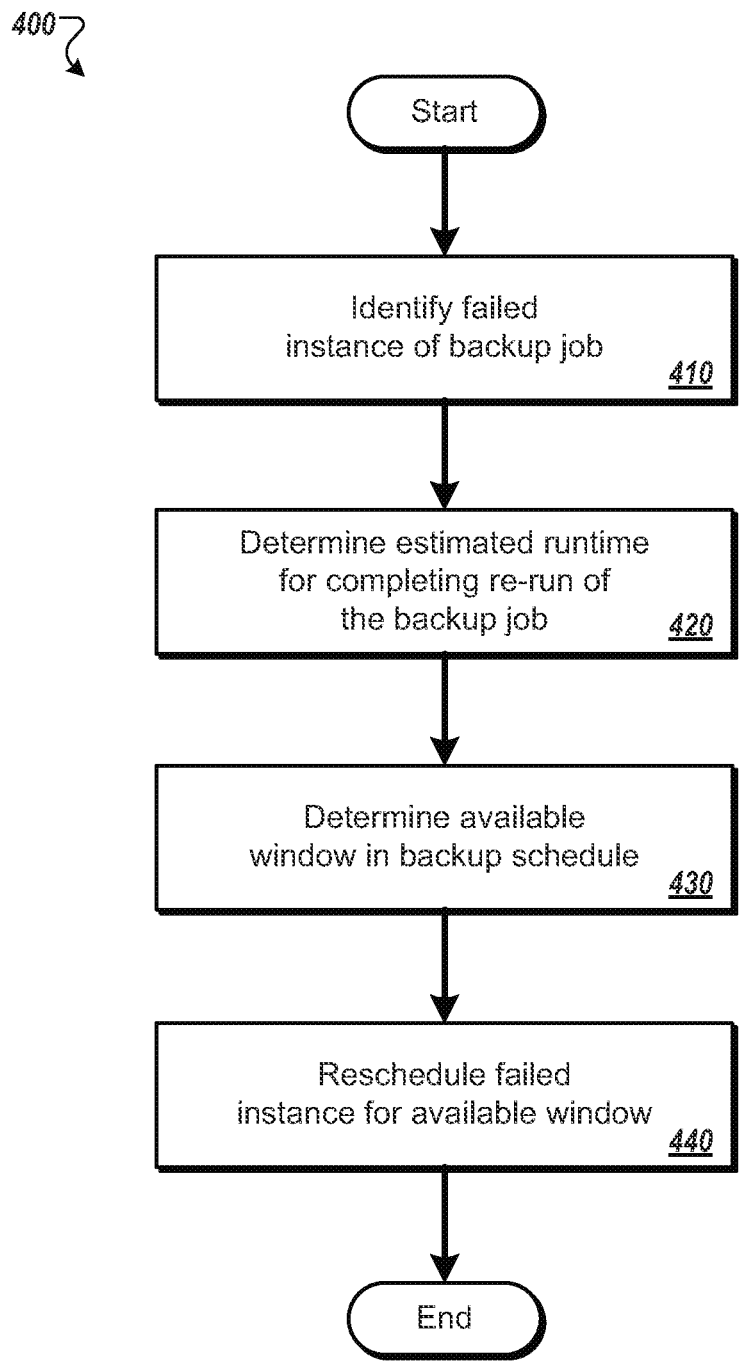
FIG. 4 shows a flow diagram of an example process for rescheduling a failed backup job.

FIG. 4 shows a flow diagram of an example process 400 for rescheduling a failed backup job. The process 400 may be performed, for example, by a backup server system, such as backup server system 108 illustrated in FIGS. 1 and 2. For clarity of presentation, the description that follows uses the backup server system 108 as the basis of an example for describing the process. However, it should be understood that another system, or combination of systems, may be used to perform the process or various portions of the process.

Process 400 begins at block 410, in which a failed instance of a backup job is identified. For example re-run module 112 executing on backup server system 108 may query a repository of current backup job schedules that includes a job status for all backup jobs that have occurred during a given time period (e.g., during a backup window from 9:00 pm to midnight on a particular day), as well as those that are scheduled to occur later in the given time period. The job status may indicate, among other things, whether a particular job has completed successfully or has failed. As such, re-run module 112 may identify one or more failed instances of backup jobs occurring during the given time period.

At block 420, an estimated runtime for completing a re-run of the backup job is determined. For example, a runtime estimator 114 executing on backup server system 108 may estimate how long it will take to re-run the failed job. In some implementations, the estimated runtime may be based on historical backup information associated with the particular job. For example, the estimated runtime may be a function of the size of the failed backup job and a weighted average historical backup rate of the job. In some implementations, the estimated runtime may also be based on the backup type of the backup job as well as the backup types of completed instances of the backup job. In some cases, only previously completed instances of a same type may be considered in estimating the runtime for completing a re-run of a particular job type.

At block 430, an available window in a backup schedule is determined. For example, scheduler 116 executing on the backup server system 108 may determine an available window of time in the backup schedule that accommodates the estimated runtime of the failed backup job. In some implementations, scheduler 116 may determine an available window of time in the backup schedule, e.g., a first available window, that equals or exceeds the estimated runtime of the failed backup job.

At block 440, the failed instance is rescheduled for the available window. For example, scheduler 116 may reschedule the failed backup job to be re-run during the available window.

Although a few implementations have been described in detail above, other modifications are possible. For example, the logic flows depicted in the figures may not require the particular order shown, or sequential order, to achieve desirable results. In addition, other steps may be provided, or steps may be eliminated, from the described flows. Similarly, other components may be added to, or removed from, the described systems. Accordingly, other implementations are within the scope of the following claims.

What is claimed is:

1. A method of rescheduling a failed backup job, the method comprising:
   identifying, using a computing system, a failed instance of a backup job;
   determining, using the computing system, an estimated amount of time to complete a rescheduled execution of the failed instance;
   determining, using the computing system, an available window of time in a backup schedule that equals or exceeds the estimated amount of time to complete the rescheduled execution;
   adding a buffer of time to at least one of a beginning and an end of the available window of time; and;
   rescheduling, using the computing system, the failed instance for execution during the available window of time.

2. The method of claim 1, wherein determining the estimated amount of time to complete the rescheduled execution is based on historical backup information associated with previously completed instances of the backup job.

3. The method of claim 2, wherein the historical backup information comprises, for the previously completed instances of the backup job, a time to complete execution of the backup job and a size of the backup job.

4. The method of claim 3, wherein the estimated amount of time to complete the rescheduled execution is a function of a size of the failed instance and a weighted average backup rate of the previously completed instances of the backup job.

5. The method of claim 3, wherein the historical backup information further comprises, for the previously completed instances of the backup job, a backup type, and wherein determining the estimated amount of time to complete the rescheduled execution excludes historical backup information that is associated with a different backup type than the failed instance.

6. The method of claim 1, wherein determining the available window of time comprises identifying a first-available window of time in the backup schedule that equals or exceeds the estimated amount of time to complete the rescheduled execution.

7. A system for rescheduling a failed backup job, the system comprising:
   a memory;
   one or more processors;
   a backup runtime estimator, executing on at least one of the one or more processors, that determines an estimated runtime for re-running a failed instance of a backup operation, wherein the estimated runtime corresponds to a length of time to complete re-running the failed instance of the backup operation;
   a scheduler, executing on at least one of the one or more processors, that identifies a re-run time in a backup schedule at which to execute the backup operation based on the estimated runtime; and
   a buffer of time added to at least one of a beginning and an end of the re-run time.

8. The system of claim 7, wherein the scheduler further schedules the backup operation for execution at the re-run time.

9. The system of claim 7, wherein the re-run time occurs during a first-available time window in the backup schedule that equals or exceeds the estimated runtime.

10. The system of claim 7, wherein the backup runtime estimator determines the estimated runtime based on historical backup information associated with the backup operation.

11. The system of claim 10, wherein the historical backup information comprises, for previously completed instances of the backup operation, a length of time to complete the backup operation and a size of the backup operation.

12. The system of claim 11, wherein the backup runtime estimator determines the estimated runtime as a function of a size of the failed instance and a weighted average backup rate of the previously completed instances of the backup operation.

13. The system of claim 11, wherein the historical backup information further comprises, for the previously completed instances of the backup operation, a backup type, and wherein the backup runtime estimator excludes historical backup information associated with a different backup type than the failed instance when determining the estimated runtime.

14. A non-transitory computer-readable storage medium storing instructions that, when executed by a processor, cause the processor to:
  determine an estimated runtime for re-running a failed instance of a backup operation, wherein the estimated runtime corresponds to a length of time to complete re-running the failed instance of the backup operation;
  determine a re-run time in a backup schedule at which to execute the backup operation based on the estimated runtime; and
  add a buffer of time to at least one of a beginning and an end of the re-run time in the backup schedule.

15. The non-transitory computer-readable storage medium of claim 14, wherein determining the estimated runtime for re-running the failed instance of the backup operation is based on historical backup information associated with the backup operation.

* * * * *